United States Patent
Ha

(10) Patent No.: US 8,399,175 B2
(45) Date of Patent: Mar. 19, 2013

(54) PHOTOPOLYMER RESINS FOR PHOTO REPLICATION OF INFORMATION LAYERS

(75) Inventor: Chau Ha, Chicago, IL (US)

(73) Assignee: Addison Clear Wave, LLC, Wood Dale, IL (US)

( * ) Notice: Subject to any disclaimer, the term of this patent is extended or adjusted under 35 U.S.C. 154(b) by 1086 days.

(21) Appl. No.: 11/380,957

(22) Filed: Apr. 7, 2008

(65) Prior Publication Data
US 2009/0252885 A1    Oct. 8, 2009

(51) Int. Cl.
*B29D 17/00* (2006.01)
*G03F 7/00* (2006.01)

(52) U.S. Cl. .............. 430/281.1; 430/321; 264/1.33
(58) Field of Classification Search .......... None
See application file for complete search history.

(56) References Cited

U.S. PATENT DOCUMENTS

| | | | | |
|---|---|---|---|---|
| 5,128,391 A * | 7/1992 | Shustack | | 522/92 |
| 5,702,792 A * | 12/1997 | Iida et al. | | 428/64.1 |
| 6,017,603 A | 1/2000 | Tokuda et al. | | |
| 6,319,404 B1 * | 11/2001 | Zhang et al. | | 210/500.29 |
| 6,617,371 B2 | 9/2003 | Ha | | |
| 6,850,681 B2 | 2/2005 | Lepont et al. | | |
| 7,384,989 B2 * | 6/2008 | Allard et al. | | 522/171 |
| 7,705,066 B2 * | 4/2010 | Tanaka et al. | | 522/90 |
| 7,829,605 B2 * | 11/2010 | Watanabe et al. | | 522/120 |
| 2003/0129385 A1 * | 7/2003 | Hojo et al. | | 428/323 |
| 2006/0047014 A1 * | 3/2006 | Hopper et al. | | 523/160 |
| 2009/0207723 A1 * | 8/2009 | Ito | | 369/283 |

FOREIGN PATENT DOCUMENTS

| | | |
|---|---|---|
| EP | 1156094 | 11/2001 |
| EP | 1112330 | 3/2005 |
| JP | 5132534 | 5/1993 |
| WO | WO 98/36325 | 8/1998 |
| WO | 2006/085992 | * 8/2006 |
| WO | 2006/012978 | * 12/2006 |

OTHER PUBLICATIONS

Machine translation of JP 05-132534 (May 1993).*
European Patent Office—European Search Report dated Sep. 12, 2007—6 pages.

* cited by examiner

*Primary Examiner* — Martin Angebranndt
(74) *Attorney, Agent, or Firm* — Miller, Matthias & Hull LLP

(57) ABSTRACT

Photopolymer resins are disclosed which includes metal and/or ceramic surface chelating agents to provide strong bonding of the photopolymer resin to the inorganic surface of the first information layer of an optical disc. The resins also include a fast surface cure and glass transition temperature controlling monomers that provides easy stamper separation The disclosed photopolymer resins also include short wavelength (<405 nm) surface cure initiators. The resins may also optionally include shrinkage control oligomers and/or polymer fillers or a combination of both Use of the disclosed resins eliminates two steps from the manufacture of a multiple information layer optical disc as the formation of spacer layers and the curing of spacer layers is no longer necessary.

7 Claims, 3 Drawing Sheets

2P PROCESS USING DISCLOSED 2P RESIN

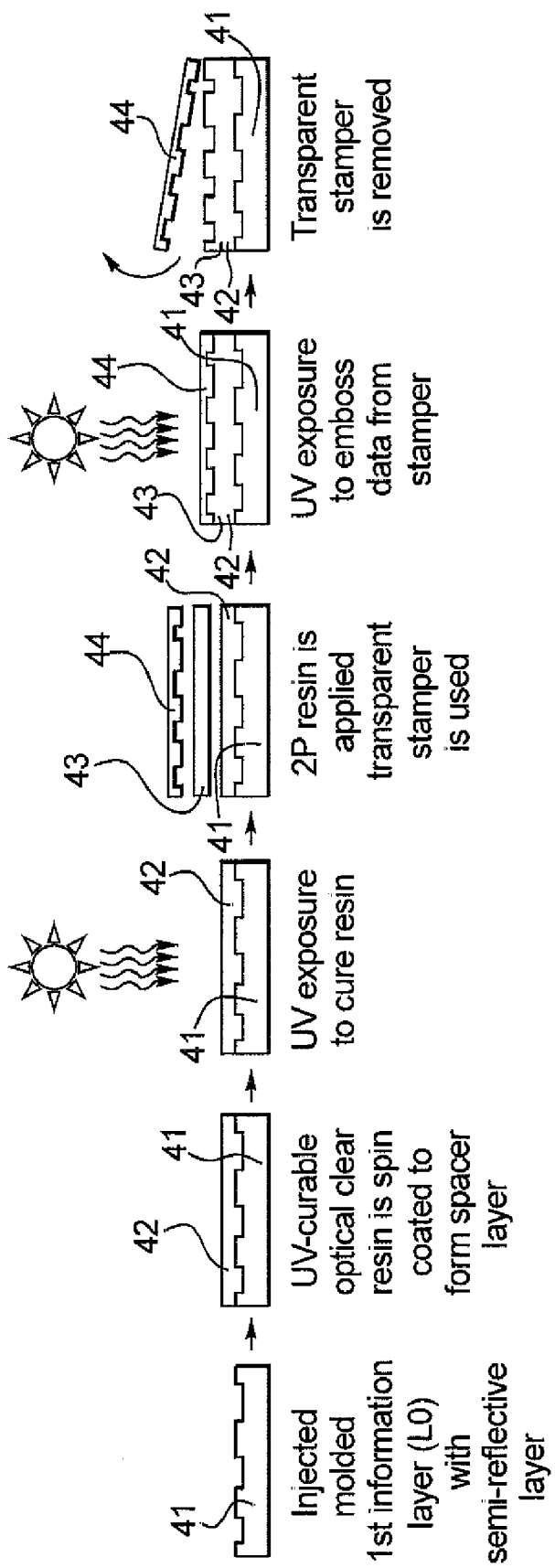

PHOTOPOLYMER RESINS FOR PHOTO REPLICATION OF INFORMATION LAYERS

BACKGROUND

1. Technical Field

This disclosure relates generally to optical discs and, more specifically, to photopolymer resins that can be used for photo replication of information layers of optical discs and related applications. Thus, this disclosure relates to optical disc applications such as Blu-ray (BD-RW, BD-RE) and high-density DVD (HD-DVD) discs

2. Description of the Related Art

One example of a popular optical storage device is the compact disc (CD). A CD can store large amounts of digital information (783 MB) on a very small surface that is inexpensive to manufacture. The CD surface is essentially a mirror covered with billions of tiny pits that are arranged in a long, tightly wound spiral or groove. The CD player reads the pits with a precise laser and interprets the information as bits of data.

The spiral of pits on a CD starts at the center of the disc. CD tracks are approximately 0.5 microns wide, with 1.6 microns separating one track from the next. The elongated pits are each about 0.5 microns wide, a minimum of 0.83 microns long and 125 nanometers high.

Most of the mass of a CD is an injection-molded piece of clear polycarbonate plastic that is about 1.2 millimeters thick. During manufacturing, this plastic is impressed with the microscopic pits that make up the long, spiral track A thin, reflective aluminum layer is then coated on the top of the disc, covering the pits.

When a CD is played or read, a laser beam of the CD player or drive passes through the polycarbonate layer of the CD, reflects off the aluminum layer and hits an optoelectronic device that detects changes in the light. The pits reflect light differently than the flat parts of the aluminum layer, which are called lands. The optoelectronic sensor detects these changes in reflectivity, and the electronics in the CD-player drive interpret the changes as data bits.

For removable storage applications, CD-recordable (CD-R) and CD-rewritable (CD-RW) devices are used CD-R works by replacing the aluminum layer in a normal CD with an organic dye compound This compound is normally reflective, but when the laser focuses on a spot and heats it to a certain temperature, it "burns" the dye, causing it to darken. To retrieve the data written to the CD-R, the laser moves back over the disc and treats each burnt spot as a pit. Data can be written to a CD-R only once; after the dye has been burned in a spot, it cannot be changed back. CD-RW and DVD discs address this problem by using phase change, which relies on a very special mixture of antimony, indium, silver and tellurium.

To provide higher data capacity CD and DVD discs to satisfy the need for higher imaging recording, high density video and TV recording, interactive DVD movies, and game applications. To increase data capacity, shorter wavelength lasers are used.

For example, the first CD formats used 780 nm lasers, then DVD formats used 650 nm lasers, and more recently Blu-ray (BD-RW, BD-RE) or high density DVD (HD-DVD) formats use 405 nm lasers. With the availability of shorter wavelength lasers, smaller pits (or pits) and narrower, more tightly packed grooves are made on the disc and more data can be packed into a given area on the disc. To further increase data density of optical discs, multiple data information layers can be constructed on the disc. In short, the data density of the high density optical discs can be increased by two ways: 1) more pits and grooves can be packed on the surface of the optical discs due to the availability of the shorter wavelength lasers and higher NA lenses, and 2) multiple information layers can be built vertically to provide mote data layers within the optical discs.

Examples of DVD-type optical discs with single, dual and four data layers are shown in FIGS. 1A-1C respectively. A partial view of a DVD disc 10A is shown in FIG. 1 with a single information layer 12. To build the multiple information layers such as those shown at 12, 14 and 16, 18, 20, 22 for the discs shown 10B and 10C in FIGS. 1B and 1C respectively, photopolymer resins (also known as "2P resins") are used for pit and groove replications. As shown in FIGS. 1B and 1C, the information layers ate separated from one another by an optically clear spacer layer shown at 24, 26, 28, 30.

There are several ways to produce multiple data layers on optical discs. One way for making such data layers is called the 2P process because of its use of photopolymer to emboss the pits and grooves on a data layer of an optical disc. The pits and grooves represent prerecorded digital information in the case of prerecorded media or tracking or header information in the case of recordable media. A typical or traditional 2P process is shown in the schematic flow diagram of FIG. 2.

In FIG. 2, an injection-molded first information layer is shown at 41, which has a semi-reflective layer (not shown). The first information layer 41 is coated with an optically clear resin that is eventually cured to form a first spacer layer 42. The first spacer layer 42 is then coated with a photopolymer resin 43 which, in turn, is engaged by the stamper 44. The stamper is preferably optically clear thereby enabling UV energy to pass through the stamper 44 so as to emboss data from the stamper 44 into the cured photopolymer layer 43 which is disposed on top of spacer layer 42. The stamper 44 is then removed.

In a traditional 2P process, two types of UV resins are required. First, the spacer layers 42 are made from UV resins that have good adhesion to the semi-reflective layer 41, which is made of metal or ceramic. The resin for the spacer layer 42 must have low shrinkage so that the radial and tangential tilts of the discs are low for good tracking of the optical discs at high rotational speeds. The second resin is a UV-curable resin for the layer 43 that has good adhesion to the cured spacer layer 42 and that can be separated readily from the transparent plastic stamper 44 after the UV exposure step.

In this technique, one plastic stamper 44 is used for each data layer. Various materials can be used for the stampers, including polycarbonates (PC), polymethylmethacrylates (PMMA), and polyolefins (PO) Only polyolefins have been successfully used without the aid of an external release layer on the stamper surface. However, polyolefins are expensive as is the alternative which would be an additional release layer on the stamper. Further lower cost plastic materials such as PC and PMMA ate polar, and their adhesion to 2P resin is too great for clean separations from the plastic stamper after the UV curing step.

SUMMARY OF THE DISCLOSURE

In satisfaction of the aforenoted needs, an improved photopolymer (2P) resin is disclosed which comprises a surface chelating agent, a monomer, and a surface cure initiator Optionally, the resin also includes a shrinkage control component in the form of an oligomers or a polymeric filler.

More specifically, a disclosed resin includes a metal and/or ceramic surface chelating agent, a fast surface curing and glass transition temperature controlling monomer, a surface cure initiator and, in optionally, a shrinkage control oligomer or and/or polymeric filler In a refinement, the chelating agent is selected from the group consisting of carboxylic acids, phosphoric acids, metal hybrid acrylates, silane coupling agents, amine based acrylates, amide based acrylates and mixtures thereof.

In a refinement, the chelating agent is selected from the group consisting of: amine acrylates, dimehtylaminoethyl methacrylates, phosphate of caprolactone modified 2-hydroxyethyl methacrylate, phosphate of 2-hydroxyethyl methacrylate, 2-methacryloyloxyethyl acid phosphate, 2-methacryloyloxyethyl succynic acid, 2-methacryloyloxyethyl hexahydrophthalate, 2-acryloyloxy ethyl succinate, 2-acryloyloxy ethyl phthalate, 2-acryloyloxy ethyl phosphate, 2-acryloyloxy ethyl phosphate diacrylate, 2-acryolyoxyethyl hexahydro phthalate, gamma-mercaptopropyltrimethoxy silane, gamma-glycidoxypropyltrimethoxysilane, N(beta-aminoehtyl)gamma-aminopropyltrimethoxy-silane, gamma-methacryloxypropyltrimethoxy silane, and mixtures thereof.

In a refinement, the glass transition temperature (Tg) for the cured 2P resin is at least 45° C.

In another refinement, the monomer is at least one of a tetra, penta, of hexa-functional In yet another refinement, the monomer is at least one of a mono-, di- or tri-acrylate.

In a refinement, the monomer is selected from the group consisting of neopentyl diacrylate, isobornyl acrylate, diacrylate of hydroxypivalaldehyde modified trimethylolpropane, hydroxyl pivalic acid neopentyl glycol diacrylate, diacrylate of tricyclodecane dimethanol, cyclohexane dimethanol dimethacrylate, ethoxylated bisphenol-A diacrylate, tripropylene glycol diacrylate, triethylene glycol diacrylate, 1,3-butylene glycol dimethacrylate, trimethylolpropane tri(meth)acrylate, tris(2-hydroxy ethyl)isocyanurate triacrylate, ethoxylated trimethylolpropane triacrylate, dimethacrylate of ethylene oxide modified bisphenol-A, t-butyl methacrylate, polyethylene glycol diacrylate, 3-methyl-1,5-pentanediol diacrylate, 2-butyl-2-ethyl-1,3-propanediol diacrylate, 2-methyl-1,8-octanediol-diacrylate1,9-nonanediol diacrylate, and mixtures thereof.

In a refinement, the initiator has an activating wavelength ranging from 310 to 405 nm.

In a refinement, the initiator is selected from the group consisting of benzophenone, 2-hydroxy-2-methyl-1-phenyl-propane-1-one, 1-hydroxy-cyclohexyl-phenol-ketone, benzophenone, and mixtures thereof In a refinement, the polymeric filler is selected from the group consisting of methyl methacrylate acrylic polymer, n-butyl methacylate polymer, methacrylate, n-butyl methacrylate copolymer, polymer or copolymer or polystyrene or polybutadiene and mixtures thereof In a refinement, the oligomer is selected from the group consisting of polyurethane, polyethers, polyesters, acrylates, and mixtures thereof.

In a refinement, a method of manufacturing an optical disc is disclosed. The method comprises: injection molding a first information layer with a semi-reflective material; spin-coating a photopolymer resin as described above on the first information layer; stamping the photopolymer resin layer with an optically clear stamper; exposing the stamped photopolymer resin layer to UV energy to emboss data from the stamper.

In a refinement of this concept, the deposition of a separate spacer layer and a curing of the separate spacer layer are not performed thereby decreasing the number of manufacturing steps required for the formation of an optical disc.

In general, formulations for the uncured 2P resins comprise: from about 0.0001 to about 10 wt % chelating agents; from about 10 to about 90 wt % high Tg monomers; from about 0.5 to about 40 wt % oligomer and/or polymeric fillers; from about 0.5 to about 15 wt % shortwavelength surface cure initiators: 0.5-15%.

Preferably, the uncured 2P resins comprise: from about 0.0002 to about 5 wt % chelating agents; from about 20 to about 90 wt % high Tg monomers; from about 0.5 to about 25 wt % oligomer and/or polymeric fillers; from about 3 to about 15 wt % shortwavelength surface cure initiators: 0.5-15%.

Most preferably, the uncured 2P resins comprise; from about 0.0006 to about 2 wt % chelating agents; from about 35 to about 90 wt % high Tg monomers; from about 0.5 to about 15 wt % oligomer and/or polymeric fillers; from about 3 to about 12 wt % shortwavelength surface cure initiators.

Other advantages and features will be apparent from the following detailed description when read in conjunction with the attached drawings

BRIEF DESCRIPTION OF THE DRAWINGS

For a more complete understanding of the disclosed resins, methods and optical discs, reference should be made to the embodiment illustrated in greater detail on the accompanying drawings, wherein:

FIG. 2 is a schematic flow diagram illustrating a prior art optical disc formation process utilizing conventional photopolymer resins and spacer layers.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Photopolymer (2P) resins are disclosed that have good adhesion to metal/ceramic surfaces of semi-reflective layers and that have good separation (release or demolding) from all types of currently employed plastic stampers used in optical disc manufacturing, including, but not limited to PC, PMMA, acrylics, PMMA-PS copolymers, polyolefins or other types of plastic. The disclosed resins provide (1) clean separation from the plastic stamper, (2) good adhesion to the semi-reflective layer, and (3) low shrinkage upon curing.

The low shrinkage, the strong adhesion to metal or semi-reflective surfaces and the clean separation from the plastic stamper allows the disclosed 2P resins to be used as both the spacer layer and the replication layer or the embossed layer. The low shrinkage ensures that desirable disc tilts can be achieved for optical discs such as Blu-ray (BD-RW, BD-RE) dual layers and HD-DVD dual layers. The low disc tilts provided by the disclosed 2P resins result in high yield production processes with higher yields, fewer steps and increased throughput.

The disclosed 2P resins that can be used to make both the spacer layer and the embossed layer of an optical disc in one step using a low cost, conventional plastic stamper such as a PC or PMMA stamper. The disclosed 2P resins enable the reduction of process steps and remove the need for more expensive stamper materials. Therefore, the disclosed resins lead to cost reductions in optical disc manufacturing.

Figure 1A:
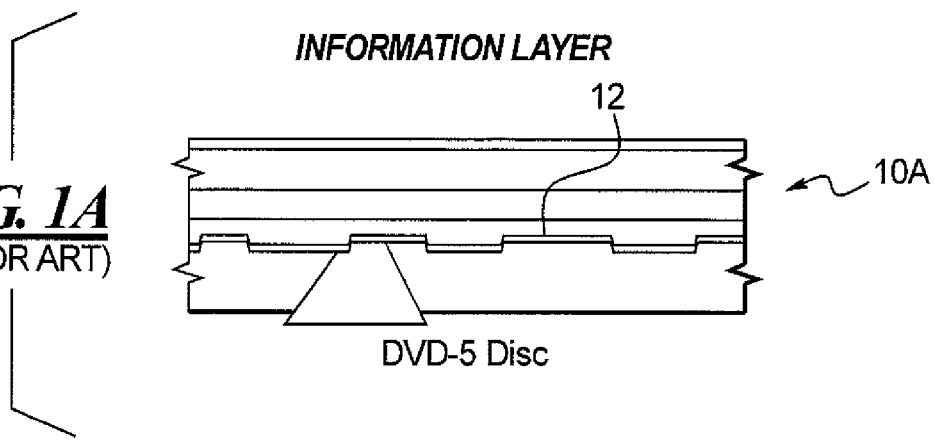
FIGS. 1A through 1C are sectional views of a single information layer DVD, a two information layer DVD and a four information layer DVD respectively.
Figure 1B:
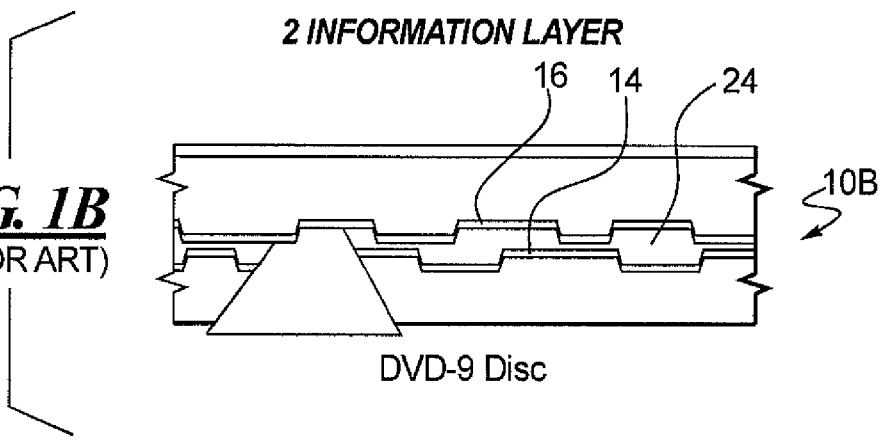
Figure 1C:
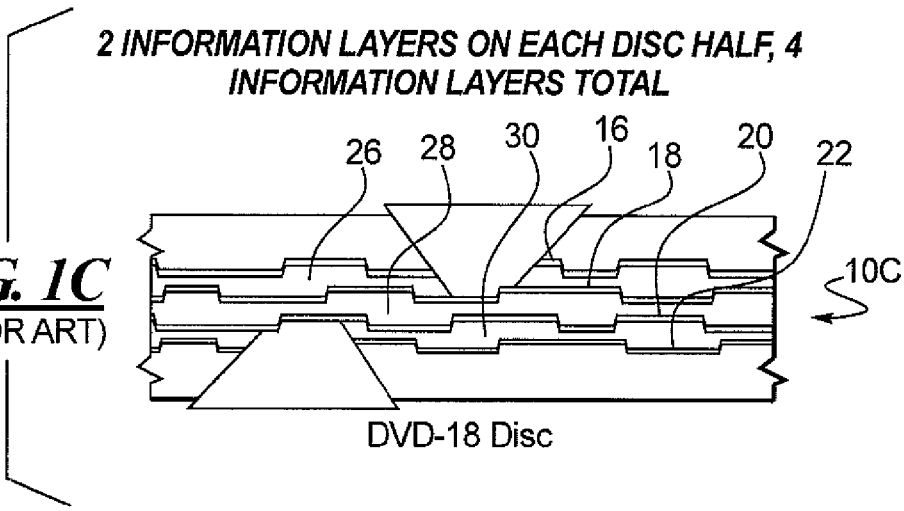
Figure 3:
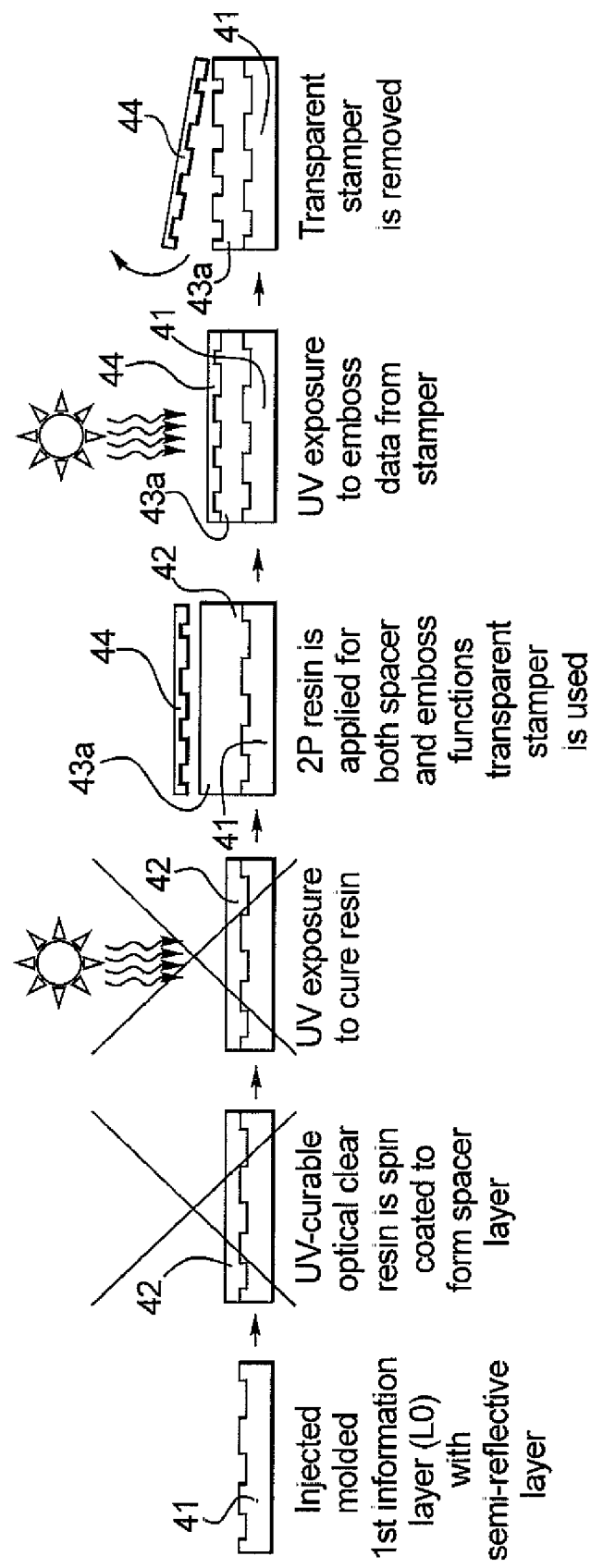
FIG. 3 is another schematic flow diagram illustrating an optical disc formation process utilizing a disclosed photopolymer resin thereby eliminating at least two separate manufacturing steps.

FIG. 3 is a schematic flow diagram of a disclosed 2P process using disclosed 2P resins where at least two process steps in conventional manufacturing techniques are eliminated.

Disclosed 2P resins may comprise:
chelating agents such as metal/ceramic surface chelating agents;
monomers such as fast surface curing and Tg controlling monomers; and
initiators, such as surface cure initiators.

Optionally, shrinkage control oligomers or polymeric fillers may be included as needed when low shrinkage is required.

Metal/Ceramic Surface Chelating Agents

Metal/ceramic surface chelating agents enhance the bonding of the 2P resin to the inorganic surface such as metal or ceramic surface of the first information layer. The chelating agents also provide differential adhesion strength to metal and plastic surfaces. The use of the chelating agents will provide higher adhesion strength of the 2P resin to the metal or ceramic surfaces in comparison to the plastic stamper. The following types of chelating agents have been found to be effective: carboxylic acids, phosphoric acids, metal hybrid acrylates, silane coupling agents, basic chelating agents including amine or amide based adhesion promoters including amine based acrylates.

Examples of specific chelating agents include, but are not limited to, the following: amine acrylates including those sold under the tradenames CN 373, CN 984, CN 384, CN 386, and CN 371, SR 368 by Sartomer Co., Ltd. (www sartomer com), dimehtylaminoethyl methacrylates sold by Kyoeisha Chemical Co (www.kyoeisha.co.jp); acid based chelating agents such as phosphate of caprolactone modified 2-hydroxyethyl methacrylate, phosphate of 2-hydroxyethyl methacrylate sold by Nippon Kayaku Co. Ltd. (www.nipponkayaku.co.jp), 2-methacryloyloxyethyl acid phosphate, 2-methacryloyloxy-ethyl succynic acid, 2-methacryloyloxyethyl hexahydro-phthalate, 2-acryloyloxy ethyl succinate, 2-acryloyloxy ethyl phthalate, 2-acryloyloxy ethyl phosphate, 2-acryloyloxy ethyl phosphate diacrylate, 2-acryolyoxyethyl hexahydro phthalate from Kyoeisha; silane chelating agents including gamma-mercaptopropyltrimethoxy silane, gamma-glycidox-ypropyltrimethoxysilane, N(beta-aminoehtyl)gamma-ami-nopropyltrimethoxy-silane, gamma-methacryloxypropyltri-methoxy silane sold by OSi Specialties, now a unit of GE Specialty Materials (http://gespecialtymaterials.com), and mixtures thereof.

Fast Surface Cure and Tg Controlling Monomers

The surface cure of the 2P resin is important to overall performance. If the surface cure is poor, the 2P resin will behave like an adhesive and will not behave like a protective coating for good plastic stamper separation. If the surface cure of the resin is poor, then the surface energy of the cured 2P resin will be greater than 70 dynes/cm. As a result, the surface of the cured resin film will be soft and it will not release cleanly from the plastic stamper. A fast surface cure of the 2P resin can be designed by using the appropriate monomers to provide the appropriate surface for the separation process steps.

The surface energy of the cured 2P resin should be in the range of 25 to 70 dynes/cm at a cure dose of less than 20 mJ/cm$^2$ for allowing good binding to the semi-reflective layer of optical disc while providing good separation from the plastic stamper.

The final glass transition temperature (Tg) for the cured 2P resin should exceed 45° C. The high Tg of the cured 2P resin is necessary for two main reasons First, the UV-curing step generates heat; therefore, if the Tg of the cured 2P resin is too low, then the pit shapes can be distorted during the separation or demolding process Second, the high Tg cured 2P resin will reduce moisture permeability through the optical disc during its life time. As a result, the high Tg 2P resin provides a high reliability optical disc.

It is well known that tetra, penta, or hexa-functional monomers provide high Tg and fast surface cure. However, these monomers have too high shrinkage upon curing. Thus, it is preferable to use only mono-, di- or tri-acrylates. Specific examples of high Tg, fast surface cute mono-, di- or tri-acrylate monomers include, but are not limited to, the following: neopentyl diacrylate, isobornyl acrylate, diacrylate of hydroxypivalaldehyde modified trimethylolpropane, hydroxyl pivalic acid neopentyl glycol diacrylate, diacrylate of tricyclodecane dimethanol, cyclohexane dimethanol dimethacrylate, ethoxylated bisphenol-A diacrylate, tripropylene glycol diacrylate, triethylene glycol diacrylate, 1,3-butylene glycol dimethacrylate, trimethylolpropane tri(meth)acrylate, tris(2-hydroxy ethyl) isocyanurate triacrylate, ethoxylated trimethylolpropane triacrylate, dimethacrylate of ethylene oxide modified bisphenol-A, t-butyl methacrylate, polyethylene glycol diacrylate, 3-methyl-1,5-pentanediol diacrylate, 2-butyl-2-ethyl-1,3-propanediol diacrylate, 2-me-thyl-1 8-octanediol-diacrylate1,9-nonanediol diacrylate, or the likes and/or mixtures thereof.

Shrinkage Control Oligomers or Polymeric Fillers

The radial tilt specification is less than 1° for some format of high density optical discs including BD and HD-DVD. To ensure a reliable and high yield manufacturing process, low shrinkage oligomer and/or polymeric fillers can optionally be used in combination with the disclosed 2P resins. Oligomers with shrinkage of less than 7% and polymeric fillers with shrinkage of about 0% are used to compensate for the high shrinkage (>8%) of the UV-curable monomers. A 2P resin with cured shrinkage of less than 8% can provide optical discs with less than 1° radial tilt The selection of oligomers or polymeric fillers are also based on the desirable 2P viscosity for processing. Examples of polymeric fillers includes methyl methacrylate acrylic polymer (Elvacite 2008-C, from Lucite International (www.lucitesolutions.com), n-butyl methacry-late polymer, methacrylate (Elvacite 2051, from Lucite) and n-butyl methacrylate copolymer (Elvacite 2767, from Lucite), polymer or copolymer or polystyrene or polybutadi-ene, or the likes Examples of low shrinkage acrylate oligomers include polyurethane, polyethers or polyesters acrylate, or the likes or mixtures thereof Surface Cute Initiators The initiators of the disclosed 2P resins are short wavelength initiators. Alpha ketone initiators including benzophe-none, 2-hydroxy-2-methyl-1-phenyl-propane-1-one (Daro-cure 1173 from Ciba-Geigy Co (www cibasc.com/darocur_ 1173 htm)), 1-hydroxy-cyclohexyl-phenol-ketone (Irgacure 184 from Ciba), benzophenone (from Aldrich Chemicals), or similar materials Shorter wavelength initiators with activating wavelength in the range of 310-405 nm provide high cross link micro surface that aids in clean demolding of the cured 2P resin from the plastic stamper. Furthermore, the laser wavelength for high density optical discs is 405 nm. The initiators use in 2P formulations for BD or HD-DVD formats discs should have absorption at wavelength shorter than 405 nm.

In general, formulations for the uncured 2P resins may comprise: from about 0.0001 to about 10 wt % chelating agents; from about 10 to about 90 wt % high Tg monomers; from about 0.5 to about 40 wt % oligomer and/or polymeric fillers; from about 0.5 to about 15 wt % shortwavelength surface cure initiators: 0.5-15%.

Preferably, the uncured 2P resins comprise: from about 0.0002 to about 5 wt % chelating agents; from about 20 to about 90 wt % high Tg monomers; from about 0.5 to about 25 wt % oligomer and/or polymeric fillers; from about 3 to about 15 wt % shortwavelength surface cure initiators: 0.5-15%.

Most preferably, the uncured 2P resins comprise: from about 0 0006 to about 2 wt % chelating agents; from about 35 to about 90 wt % high Tg monomers; from about 0.5 to about 15 wt % oligomer and/or polymeric fillers; from about 3 to about 12 wt % shortwavelength surface cure initiators.

EXAMPLES

Example 1:

| Ingredients | Function | Fraction |
|---|---|---|
| Isobornyl acrylate | Monomer, fast curing, control Tg | 0.25 |
| Neopentylglycol diacrylate | Monomer, fast curing, control Tg | 0.5 |
| Dimethacrylate of ethylene oxide modified bisphenol-A | Monomer, fast curing, control Tg | 0.2 |
| 2-methacryloyloxyehtyl acid phosphate | Metal/ceramic chelating agent | 0.01 |
| Irgacure 184 | Surface cure initiator | 0.04 |
| Formulation results | | |
| Shrinkage (%) | | 6 |
| Peeling from PC stamper | | excellent |
| Adhesion to semi-reflective layer | | excellent |

Example 2:

| Ingredients | Function | Fraction |
|---|---|---|
| Isobornyl acrylate | Monomer, fast curing, control Tg | 0.25 |
| Neopentylglycol diacrylate | Monomer, fast curing, control Tg | 0.5 |
| Dimethacrylate of ethylene oxide modified bisphenol-A | Monomer, fast curing, control Tg | 0.15 |
| Elvacite 2008-C | Polymeric filler | 0.05 |
| 2-methacryloyloxyehtyl acid phosphate | Metal/ceramic chelating agent | 0.01 |
| Irgacure 184 | Surface cure initiator | 0.04 |
| Formulation results | | |
| Shrinkage (%) | | 3 |
| Peeling from PC stamper | | excellent |
| Adhesion to semi-reflective layer | | excellent |

Example 3:

| Ingredients | Function | Fraction |
|---|---|---|
| Diacrylate of hydroxypivalaldehyde modified trimethylolpropane | Monomer, fast curing, control Tg | 0.4 |
| Neopentylglycol diacrylate | Monomer, fast curing, control Tg | 0.4 |
| Dimethacrylate of ethylene oxide modified bisphenol-A | Monomer, fast curing, control Tg | 0.1 |
| Elvacite 2008-C | Polymeric filler | 0.05 |
| 2-methacryloyloxyehtyl acid phosphate | Metal/ceramic chelating agent | 0.01 |
| Irgacure 184 | Surface cure initiator | 0.04 |
| Formulation results | | |
| Shrinkage (%) | | 3 |
| Peeling from PC stamper | | excellent |
| Adhesion to semi-reflective layer | | excellent |

Example 4:

| Ingredients | Function | Fraction |
|---|---|---|
| Diacrylate of hydroxypivalaldehyde modifiedtrimethylolpropane | Monomer, fast curing, control Tg | 0.4 |
| Neopentylglycol diacrylate | Monomer, fast curing, control Tg | 0.43 |
| Dimethacrylate of ethylene oxide modified bisphenol-A | Monomer, fast curing, control Tg | 0.05 |
| Elvacite 2008-C | Polymeric filler | 0.05 |
| Amine acrylate CN 373 | Metal/ceramic chelating agent | 0.03 |
| Irgacure 184 | Surface cure initiator | 0.04 |
| Formulation results | | |
| Shrinkage (%) | | 2 |
| Peeling from PC stamper | | excellent |
| Adhesion to semi-reflective layer | | excellent |

Example 5:

| Ingredients | Function | Fraction |
|---|---|---|
| Diacrylate of hydroxypivalaldehyde modified trimethylolpropane | Monomer, fast curing, control Tg | 0.4 |
| Neopentylglycol diacrylate | Monomer, fast curing, control Tg | 0.33 |
| t-butyl methacrylate | Monomer, fast curing, control Tg | 0.15 |
| Polystyrene polymer (from Bimax) | Polymeric filler | 0.05 |
| Amine acrylate CN 373 | Metal/ceramic chelating agent | 0.03 |
| Darocure 1173 | Surface cure initiator | 0.04 |
| Formulation results | | |
| Shrinkage (%) | | 5 |
| Peeling from PC stamper | | excellent |
| Adhesion to semi-reflective layer | | excellent |

Example 6:

| Ingredients | Function | Fraction |
|---|---|---|
| Diacrylate of hydroxypivalaldehyde modified trimethylolpropane | Monomer, fast curing, control Tg | 0.4 |
| Neopentylglycol diacrylate | Monomer, fast curing, control Tg | 0.43 |
| trimethyolpropane trimethacrylate | Monomer, fast curing, control Tg | 0.05 |
| Polystyrene polymer (from Bimax) | Polymeric filler | 0.05 |
| Amine acrylate CN 373 | Metal/ceramic chelating agent | 0.03 |
| Darocure 1173 | Surface cure initiator | 0.04 |
| Formulation results | | |
| Shrinkage (%) | | 4 |
| Peeling from PC stamper | | excellent |
| Adhesion to semi-reflective layer | | excellent |

Example 7:

| Ingredients | Function | Fraction |
|---|---|---|
| Diacrylate of hydroxypivalaldehyde modified trimethylolpropane | Monomer, fast curing, control Tg | 0.4 |
| Neopentylglycol diacrylate | Monomer, fast curing, control Tg | 0.48 |
| trimethyolpropane trimethacrylate | Monomer, fast curing, control Tg | 0.05 |
| Amine acrylate CN 373 | Metal/ceramic chelating agent | 0.03 |
| Darocure 1173 | Surface cure initiator | 0.04 |
| Formulation results | | |
| Shrinkage (%) | | 7 |
| Peeling from PC stamper | | excellent |
| Adhesion to semi-reflective layer | | excellent |

In the above examples, the primary ingredient is always the monomer or combination of monomers. By keeping the monomer content high, the resulting uncured resin will have a low viscosity, preferably at or less than 300 cp, which makes the uncured resin ideal for spin coating. However, uncured resins having substantially higher viscosities, exceeding 300 cp and even upwards in the range of 5,000-6,000 cp can be used for spin coating applications, the process is just slowed. Thus, to keep the viscosity low, substantial amounts of monomers are used and the monomers are the primary component. While only one fast curing, Tg controlling monomer is needed, combinations are utilized in the examples cited above and the specific monomer components are combined based upon their viscosity, curing times, and glass transition temperatures.

One way to increase the viscosity is to add shrinkage control, oligomers, or polymeric fillers, at the expense of monomer content. This is achieved in examples 2-6. Any of the shrinkage control oligomers listed above can be added to the examples 1-7 to increase viscosity and address the shrinkage control issue.

As shown in FIG. 3, the use of the photopolymer resin disclosed herein eliminates at least two process steps for a dual information layer disc and additional process steps for optical discs having more then two information layers. Specifically, the disclosed photopolymer resins eliminate the need to deposit and cute a clear spacer layer 42. Only a photopolymer resin layer 43a is deposited directly on top the first information layer 41. This layer 43a is then stamped with a stamper 44 and cured to create the second information layer as shown at the right in FIG. 3 By eliminating at least two process steps for only a two information layer disc, and additional process steps for a four layer optical disc and so on, the disclosed resins improve manufacturing efficiency, increase throughput, and increase manufacturing yields.

While only certain embodiments have been set forth, alternatives and modifications will be apparent from the above description to those skilled in the art These and other alternatives are considered equivalents and within the spirit and scope of this disclosure and the appended claims.

What is claimed:

1. A photopolymer resin cleanly separable from a plastic stamper, well adhering to a semi-reflective layer, and consisting of:
   a surface chelating agent selected from the group consisting of: amine acrylates, phosphate of caprolactone modified 2-hydroxyethyl methacrylate, phosphate of 2-hydroxyethyl methacrylate, 2-methacryloyloxy ethyl acid phosphate, 2-methacryloyloxy ethyl succinic acid, 2-methacryloyloxy ethyl hexahydrophthalate, 2-acryloyloxy ethyl succinate, 2-acryloyloxy ethyl phthalate, 2-acryloyloxy ethyl phosphate, 2-acryloyloxy ethyl phosphate diacrylate, 2-acryolyoxy ethyl hexahydro phthalate, N(beta-aminoethyl) gamma-aminopropyltrimethoxy-silane, and mixtures thereof;
   a monomer selected from the group consisting of neopentyl glycol diacrylate, diacrylate of hydroxypivalaldehyde modified trimethylolpropane, hydroxyl pivalic acid neopentyl glycol diacrylate, diacrylate of tricyclodecane dimethanol, cyclohexane dimethanol dimethacrylate, ethoxylated bisphenol-A diacrylate, triethylene glycol diacrylate, 1,3-butylene glycol dimethacrylate, dimethacrylate of ethylene oxide modified bisphenol-A, t-butyl methacrylate, polyethylene glycol diacrylate, 3-methyl-1,5-pentanediol diacrylate, 2-butyl-2-ethyl-1,3-propanediol diacrylate, 2-methyl-1,8-octanediol-diacrylate, 1,9-nonanediol diacrylate, and mixtures thereof; and
   a surface cure initiator selected from the group consisting of 2-hydroxy-2-methyl-1-phenyl-propan-1-one.

2. The resin of claim 1 wherein the glass transition temperature (Tg) for the cured 2P resin is at least 45° C.

3. The resin of claim 1 wherein the monomer is at least one of a mono-, di- or tri-acrylate.

4. A method of manufacturing an optical disc, the method comprising:
   injection molding a first information layer with a semi-reflective material;
   spin-coating a photopolymer resin of claim 1 on the first information layer;
   stamping the photopolymer resin layer with an optically clear stamper;
   exposing the stamped photopolymer resin layer and the stamper to UV energy to emboss data from the stamper;
   removing the stamper from the stamped photopolymer resin layer.

5. The method of claim 4 wherein the deposition of a separate spacer layer and a curing of the separate spacer layer is not performed.

6. A photopolymer resin cleanly separable from a plastic stamper, well adhering to a semi-reflective layer, and consisting of:

from about 0.0001 to about 10 wt % of a metal and ceramic surface chelating agent selected from the group consisting of: amine acrylates, phosphate of caprolactone modified 2-hydroxyethyl methacrylate, phosphate of 2-hydroxyethyl methacrylate, 2-methacryloyloxy ethyl acid phosphate, 2-methacryloyloxy ethyl succinic acid, 2-methacryloyloxy ethyl hexahydrophthalate, 2-acryloyloxy ethyl succinate, 2-acryloyloxy ethyl phthalate, 2-acryloyloxy ethyl phosphate, 2-acryloyloxy ethyl phosphate diacrylate, 2-acryolyoxy ethyl hexahydro phthalate, N(beta-aminoethyl) gamma-aminopropyltrimethoxy-silane, and mixtures thereof;

from about 10 to about 90 wt % of a fast curing and glass transition temperature (Tg) controlling monomer selected from the group consisting of neopentyl glycol diacrylate, diacrylate of hydroxypivalaldehyde modified trimethylolpropane, hydroxyl pivalic acid neopentyl glycol diacrylate, diacrylate of tricyclodecane dimethanol, cyclohexane dimethanol dimethacrylate, ethoxylated bisphenol-A diacrylate, triethylene glycol diacrylate, 1,3-butylene glycol dimethacrylate, dimethacrylate of ethylene oxide modified bisphenol-A, t-butyl methacrylate, polyethylene glycol diacrylate, 3-methyl-1,5-pentanediol diacrylate, 2-butyl-2-ethyl-1,3-propanediol diacrylate, 2-methyl-1,8-octanediol-diacrylate, 1,9-nonanediol diacrylate, and mixtures thereof;

from about 0.5 to about 15 wt % of a surface cure initiator selected from the group consisting of 2-hydroxy-2-methyl-1-phenyl-propan-1-one; and from about 0.5 to about 40 wt % of at least one of a low shrinkage oligomer and a olymeric filler.

7. The resin of claim 6 wherein the filler is selected from the group consisting of methyl methacrylate acrylic polymer, n-butyl methacrylate polymer, polymethacrylate, n-butyl methacrylate copolymer, polybutadiene and mixtures thereof, and wherein the oligomer is selected from the group consisting of polyethers, polyesters, acrylates, and mixtures thereof.

* * * * *